H. B. BUCH.
Hub.
No. 57,855. Patented Sept. 11, 1866.
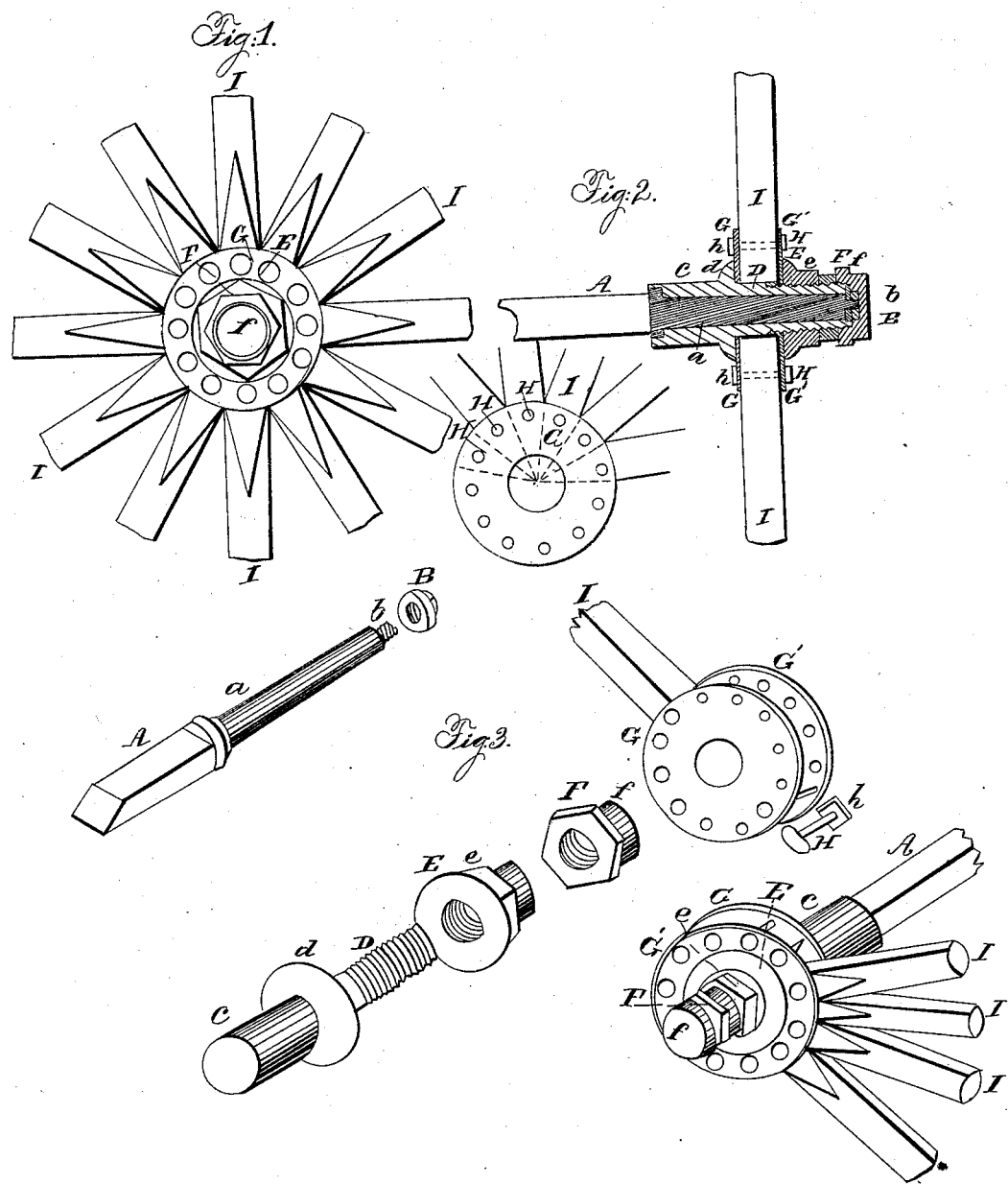

UNITED STATES PATENT OFFICE.

HENRY B. BUCH, OF LITIZ, PENNSYLVANIA.

IMPROVEMENT IN METALLIC HUBS.

Specification forming part of Letters Patent No. 57,855, dated September 11, 1866.

*To all whom it may concern:*

Be it known that I, HENRY B. BUCH, of Litiz, in the county of Lancaster and the State of Pennsylvania, have invented a new and useful Combination in the Construction of Carriage-Wheels and Metallic Hubs; and I do hereby declare that the following is a full, clear, and exact description of the construction and operation of the same, reference being had to the accompanying drawings, making a part of this specification, in which—

Figure 1 is a side view of the wheel and hub; Fig. 2, a section or longitudinal elevation of the parts. Figs. 3 illustrate, in perspective, the several parts detached.

The nature of my invention consists in affixing each spoke of the wheel to a wide and flat ring or disk (with a central opening for the pipe-box) on each side by means of headed bolts with nuts, the radial spokes being all independent of each other, and beveled with the radius, so as to meet centrally, and when bolted and secured between said disks, turned off evenly with the openings of the disk, forming a solid or compact center around the pipe-box. The spokes thus united and secured to the rings or disks form the wheel without boxing or connection with what is ordinarily termed the "hub." A broken spoke can also be removed and replaced by a new one with the greatest ease, besides forming, combined with the other portions, one of the most durable as well as elegant wheels in use; and to prevent undue strain in case the axle becomes wedged, the plates or disks can be adjusted, and when loose, by means of the nut and the flanges on the nut and pipe-box resting against these rings or disks, can be sufficiently drawn up to tighten any looseness occasioned by wear.

To enable others skilled in the art to make and use my invention, I will proceed to describe its construction.

The two flat rings or disks G G' are pierced at regular intervals for bolts H, having a broad head on one end and a screw for a nut, $h$, on the other. The spokes I, with their bevel ends radiating from the center of the circular plates or disks, are brought up in solid contact to the outer edge of said disks, perforated for said bolts H. The spokes are thus fixed respectively by passing a bolt through the disks G and spoke I, secured by the nuts $h$, and turned off smoothly even with the openings shown in the disks G G'. The pipe-box C, with its flange $d$ and prolonged pipe-screw D, is now inserted through the eye of the wheel or combined disks and spokes, when the nut $e$, with its flange E, is screwed onto the pipe.

The flange E on the nut and the flange $d$ on the pipe-box C rest squarely against the disk-plates G G' on their respective sides of the wheel, and with the disks combine to form the hub. The pipe-box C, with its screw-surface (externally) D, extends beyond the flanged nut E $e$ when drawn up to its place. The axle A or spindle $a$ is now inserted into the pipe-box, reaching beyond the outer end of the same, but reduced in diameter, terminated by a screw-thread, $b$, for the nut B, having an inner flange or shoulder resting against the shoulder of the spindle and terminus of the pipe-box. This secures the spindle. The cap F $f$ is then screwed onto the projecting screw portion of the pipe-box C, covering the nut B of the spindle, and, being closed at the outer end, $f$, secures it against the admission of any dust or dirt to the spindle, and preventing all waste of lubricating materials, giving the hub and wheel a neat finish, and producing a combination of superior efficacy and firmness.

Since I have made my invention I learn that rings or disks have been used without bolts, and some, perhaps, with bolts may be shown.

I am also made aware that iron hubs have been patented made in two sections, where the spokes are radially driven in, others having alternate depressions and projections, in combination with the flanged sides, through which a shouldered pipe-box enters and holds one side, while the other side is held by a nut on the screw portion of the pipe-box. This latter nut, however, has a screw end for the cap, forming a chamber, and a combination of parts different in construction and object, which diverse combinations are claimed when all their parts are arranged as severally specified; hence I am also confined to my combination as herein specified. I therefore cannot independently claim the disks or side rings G G', nor the bolts H; and although my pipe-box, with its flange d resting squarely against the vertical side of the disk G, and its prolonged screw for both the flanged nut E e and cap F f on the outer end, are of a different construction from any other known to me, and the object of the nut E e for tightening the disks G G', containing the spokes, between them, (which latter form a part of the wheel independent from the hub,) presents a marked difference when collectively considered, embracing novel features of great utility thus combined, which render it worthy of protection, I therefore do not claim any part independently considered.

What I claim as my invention, and desire to secure by Letters Patent, is—

A metallic hub formed by the union of the pipe-box C, with its flange d and prolonged screw-pipe D, together with the flanged nut E e, cap F f, all held on the pipe-box, in combination with the annular disks G G', headed bolts H, and their nuts h, all combined and arranged in the manner and for the purpose specified.

HENRY B. BUCH.

Witnesses:
 WM. B. WILEY,
 JACOB STAUFFER.